United States Patent
Ehlert et al.

(10) Patent No.: US 11,408,578 B2
(45) Date of Patent: Aug. 9, 2022

(54) METHOD OF OPERATING AN ILLUMINATING DEVICE FOR A VEHICLE AND AN ILLUMINATING DEVICE FOR A VEHICLE

(71) Applicant: Hella GmbH & Co. KGaA, Lippstadt (DE)

(72) Inventors: Kai Ehlert, Büren (DE); Bernd Giepen, Erwitte (DE); Pascal Janke, Münster (DE); Dirk Kliebisch, Paderborn (DE); Boris Kubitza, Möhnesee-Körbecke (DE)

(73) Assignee: Hella GmbH & Co. KGaA, Lippstadt (DE)

(*) Notice: Subject to any disclaimer, the term of this patent is extended or adjusted under 35 U.S.C. 154(b) by 243 days.

(21) Appl. No.: 16/750,442

(22) Filed: Jan. 23, 2020

(65) Prior Publication Data
US 2020/0240607 A1   Jul. 30, 2020

(30) Foreign Application Priority Data
Jan. 24, 2019   (DE) .......................... 102019101710.6

(51) Int. Cl.
| B60Q 1/14 | (2006.01) |
| F21S 41/64 | (2018.01) |
| F21S 41/153 | (2018.01) |
| F21S 41/675 | (2018.01) |
| H05B 45/50 | (2022.01) |

(Continued)

(52) U.S. Cl.
CPC ............. *F21S 41/645* (2018.01); *B60Q 1/14* (2013.01); *F21S 41/153* (2018.01); *F21S 41/16* (2018.01); *F21S 41/675* (2018.01);

*H05B 45/50* (2020.01); *F21Y 2115/10* (2016.08); *F21Y 2115/30* (2016.08)

(58) Field of Classification Search
CPC ........ H05B 45/50; H05B 47/29; B60Q 1/085; B60Q 1/1423; F21S 41/645; H04N 9/735
See application file for complete search history.

(56) References Cited

U.S. PATENT DOCUMENTS

2009/0322879 A1* 12/2009 Faber ................... H04N 5/3675
                                                    348/148
2010/0034481 A1*  2/2010 Forutanpour ........ H04N 5/3675
                                                    382/275

(Continued)

FOREIGN PATENT DOCUMENTS

CN    101945513 A    1/2011

*Primary Examiner* — Tung X Le
(74) *Attorney, Agent, or Firm* — Husch Blackwell LLP

(57) ABSTRACT

A method is provided for operating an illuminating device for a vehicle that features means of influencing light or a plurality of light sources for the targeted generation of pixels of a light distribution. In the event of failure of at least one pixel of the light distribution caused by a defect in one section of the means of influencing light or by malfunction of one of the light sources, at least one non-defective section of the means of influencing light or at least one non-malfunctioning light source is actuated in order to correct the light distribution. The at least one non-defective section of the means of influencing light or at least one of the non-malfunctioning light sources is actuated in such a way that at least one pixel of the light distribution adjacent to the at least one malfunctioning pixel is reduced in its brightness.

9 Claims, 1 Drawing Sheet

(51) Int. Cl.
*F21S 41/16* (2018.01)
*F21Y 115/30* (2016.01)
*F21Y 115/10* (2016.01)

(56) References Cited

U.S. PATENT DOCUMENTS

2011/0267467 A1* 11/2011 Kimura ................ G02B 27/283
                                                  348/148
2020/0077066 A1*  3/2020 Cao .................... H04N 9/643

* cited by examiner

METHOD OF OPERATING AN ILLUMINATING DEVICE FOR A VEHICLE AND AN ILLUMINATING DEVICE FOR A VEHICLE

CROSS REFERENCE

This application claims priority to German Application No. 10 2019 101710.6, filed Jan. 29, 2019, the entirety which is hereby incorporated by reference.

FIELD OF THE INVENTION

The present invention relates to a method for operating an illuminating device for a vehicle.

BACKGROUND

A method and a device of the aforementioned type are known from CN 101945513 A. The device described therein features a plurality from light emitting diodes (LEDs). If one of these light emitting diodes fails the others are actuated in such a way that they shine brighter. This means that the failure of the one light emitting diode is compensated for with regard to the overall intensity of the light emitted from the illuminating device.

The generation of a light distribution of an LED matrix headlamp is implemented by overlapping the light of individual light emitting diodes. In this respect, a matrix headlamp can consist of several hundred light emitting diodes. In the case of high resolution headlamps, such as what are known as pAFS LED headlamps or headlamps with a pixel blind on the basis of an LC display, the number of light emitting diodes and of pixels may be significantly higher. The failure of individual light emitting diodes or individual sections of the LC display serving as means of influencing light may lead to gaps in the light distribution and thus to distracting inhomogeneities in the light distribution. If, in the event of failure, the statutory minimum requirements are still reached, it is generally not necessary to replace the headlamp. Nevertheless, the gaps in the light distribution can cause distracting visual effects, that reduce the level of acceptance on the part of the vehicle user.

SUMMARY OF THE INVENTION

The issue underlying the present invention is the disclosure of a method of the type described at the beginning o this document and the creation of a device of the type described at the beginning of the document that prevent or reduce the distracting visual effects in the light distribution generated by the illuminating device.

In accordance with the invention, this is achieved by a method of the kind described at the beginning of this document with the characteristic features of claim 1 and by a device of the type described at the beginning of this document with the characteristic features of claim 7. The subclaims related to preferred embodiments of the invention.

In accordance with claim 1, it is intended that the at least one non-defective section of the means of influencing light or the at least one of the non-malfunctioning light sources is actuated in such a way that at least one pixel of the light distribution adjacent to the at least one malfunctioning pixel is reduced in its brightness. In this way, the failure of an individual light source or individual light sources or individual pixels are less visible so that acceptance on the part of users is increased.

One option is that the at least one non-defective section of the means of influencing light or the at least one of the non-malfunctioning light sources is actuated in such a way that several pixels of the light distribution adjacent to the at least one malfunctioning pixel are reduced in their brightness. In particular, one option is that at least one pixel adjacent to at least one malfunctioning pixel of the light distribution is reduced in its brightness such that the transition from the at least one malfunctioning pixel to the at least one adjacent pixel does not feature a hard gradient. This makes it possible to avoid hard transitions or light-refracting edges from the malfunctioning pixel to the adjacent edges resulting in a more homogenous illumination.

There is the option that several non-defective sections of the means of influencing light or several of the non-malfunctioning light sources are actuated such that several pixels of the light distribution that are at different distances from the at least one malfunctioning pixel are reduced to different extents in their brightness, where at least one first pixel adjacent to the at least one malfunctioning pixel of the light distribution is reduced to a greater extent in its brightness than at least one second pixel further away from the at least one malfunctioning pixel of the light distribution. In this way, the transition from the defective position on the light distribution to its surroundings is modeled as smooth as possible so that the failure of one pixel or several pixels can hardly be noticed.

For example, one option is that at least one pixel adjacent to the at least one malfunctioning pixel of the light distribution or pixels located in its vicinity are reduced in their brightness by 10% to 50%, specifically by 20% to 40%. Corresponding adjustments to the dimming values of the light sources or the dimming steps of the pixels can form the transition from the at least one malfunctioning pixel to its surroundings in such a way that it is less noticeable.

There is the option that a new light distribution is calculated that takes into account a defect in one section of the means of influencing light or the malfunction of one of the light sources and in doing so features a smooth as possible transition from the at least one malfunctioning pixel to its surroundings, where the means of influencing light or the light sources are actuated in accordance with the newly calculated light distribution. In this way, a plurality of sections of the means of influencing light or a plurality of the light sources can be included in the modeling of a smooth transition from the gap in the light distribution to its surroundings.

In accordance with claim 7, it is intended for the control systems to be able to perform an inventive method.

There is the option that the illuminating device comprises, in addition to the means of influencing light, at least one light source whose light hits the means of influencing light during operation of the illuminating device and is reflected or switched off or deflected by the means of influencing light in a targeted manner with regard to individual pixels or groups of pixels, where the light influenced in such a way by the means of influencing light at least partially exits the illuminating device. In particular, the means of influencing light can be designed as a digital micromirror device or as an LCoS or LC display or that the means of influencing light comprises a digital micromirror device or an LCoS or an LC display.

There is the alternative option that the light sources are designed as light emitting diodes or as laser diodes, where specifically the light emitting diodes or laser diodes are arranged in a matrix, for example where the light emitting diodes are integrated into a solid state LED array.

The means of illumination can be a headlamp, specifically a high resolution headlamp.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the figures, identical and functionally identical parts have the same reference signs.

In a first sample embodiment, the illuminating device is designed as a high resolution headlamp featuring a plurality of light emitting diodes arranged in a matrix. In particular, the light emitting diodes may be integrated into a solid state LED array. The headlamp further comprises control systems that can calculate and create a light distribution by means of actuating the individual light emitting diodes in the corresponding manner.

Figure 1:
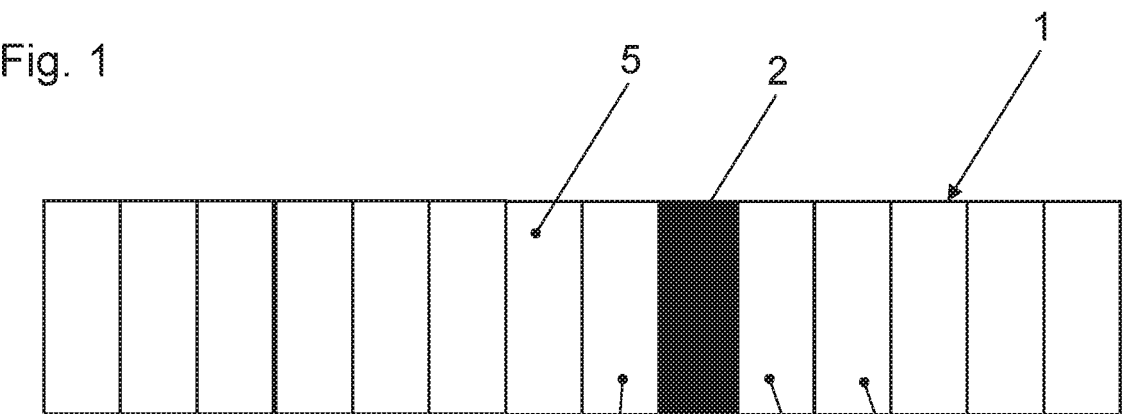
FIG. 1 is a schematic depiction of part of a light distribution with a dark area in which at least one pixel or several pixels have failed due to a defect in one section of the means of influencing light or due to the failure of one of the light sources.

The failure of one the light emitting diodes results in a gap in the light distribution 1 that corresponds to failure of one pixel 2 or several pixels 2 in the light distribution 1. A corresponding gap with at least one malfunctioning pixel 2 is indicated in the light distribution 1 in FIG. 1. Prior to adjustment by means of the inventive method, the transition to the adjacent pixels 3 is very hard.

The control systems can calculate a new light distribution 1 in response to the failure of one of the light emitting diodes that takes into account such failure of one of the light emitting diodes and in doing so specifically features a smooth as possible transition from the gap in the light distribution 1 to its surroundings. Corresponding to this newly calculated light distribution 1, the light emitting diodes are actuated by the control systems in such a way that the pixels 3 adjacent to the gap in the light distribution 1 are reduced in their brightness.

Figure 2:
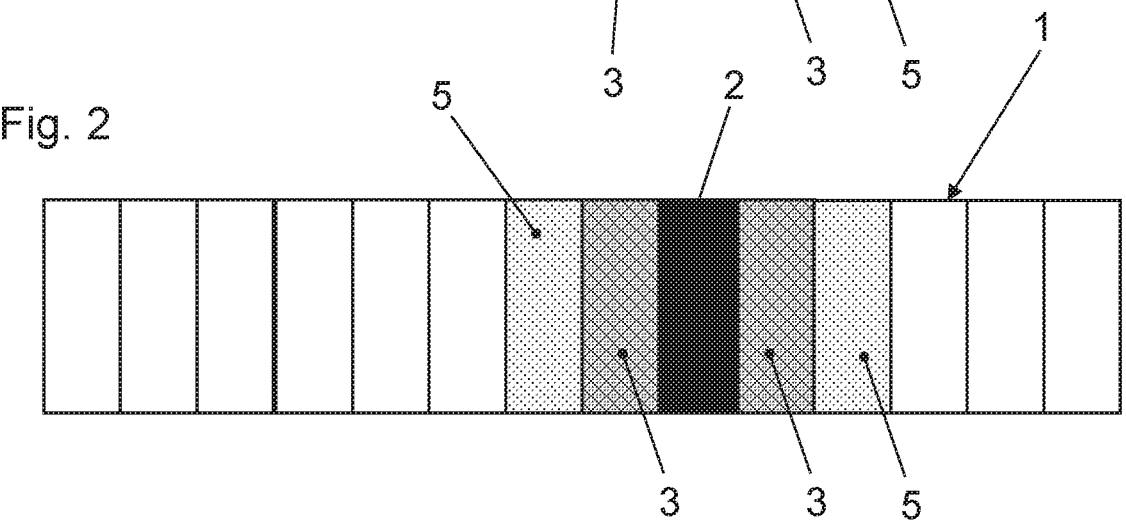
FIG. 2 is a depiction of the light distribution corresponding to FIG. 1 with inventive adjustment of the surroundings of the dark area in a horizontal orientation.
Figure 3:
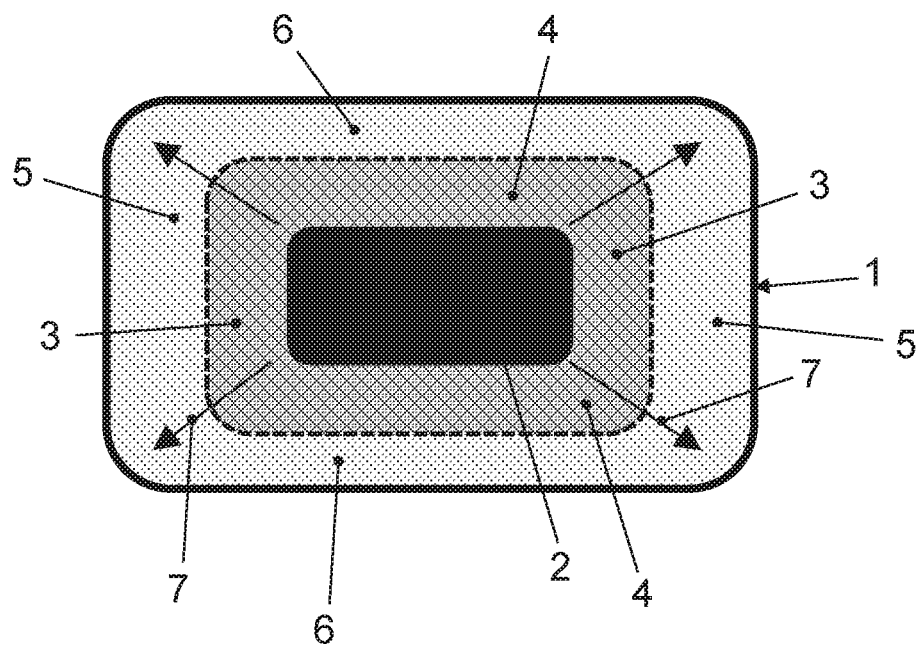
FIG. 3 is a schematic depiction of part of a further light distribution with a dark area in which at least one pixel or several pixels have failed due to a defect in one section of the means of influencing light or due to the failure of one of the light sources, and with horizontal adjustment of the surroundings of the dark area in a horizontal and a vertical orientation.

FIG. 2 shows this merely for horizontally adjacent pixels 3. FIG. 3 shows this for horizontally and vertically adjacent pixels 3, 4. The reduced brightness of the pixels 3, 4 is indicated by a more or less dense dot matrix.

In this context, the pixels 3, 4 immediately adjacent to the at least one malfunctioning pixel 2 of the light distribution 1 are reduced to a greater extent in their brightness than pixels 5, 6 a little further away from the at least one malfunctioning pixel 2 of the light distribution 1. This provides a smooth transition from the gap in the light distribution 1 to its surroundings. Corresponding gradients 7 of the brightness are indicated schematically in FIG. 3.

In a second sample embodiment, the illuminating device is designed as a high resolution headlamp that features as an example a light source and means of influencing in the form of a light emitting diode or laser diode. The means of influencing can reflect or switch off or deflect the light emitted by the light source in a targeted manner with regard to individual pixels or groups of pixels. Specifically, the means of influencing can take the form of an LC display. As an alternative, a digital micromirror device can also be used, for example. The headlamp further comprises control systems that can calculate and create a light distribution 1 by means of actuating individual sections of the LC display in the corresponding manner.

Ca

The failure of one section of the LC display results in a gap in the light distribution 1 that corresponds to failure of one pixel 2 or several pixels 2 in the light distribution. The control systems can calculate a new light distribution 1 in response to the failure of one section of the LC display that takes into account such failure of a section of the LC display and in doing so specifically features a smooth as possible transition from the gap in the light distribution 1 to its surroundings. Corresponding to this newly calculated light distribution 1, the individual sections of the LC display are actuated by the control systems in such a way that the pixels 3, 4 adjacent to the gap in the light distribution are reduced in their brightness.

Once again in this sample embodiment, the pixels 3, 4 immediately adjacent to the at least one malfunctioning pixel 2 of the light distribution 1 are reduced to a greater extent in their brightness than pixels 5, 6 a little further away from the at least one malfunctioning pixel 2 of the light distribution 1. This provides a smooth transition from the gap in the light distribution 1 to its surroundings.

LIST OF REFERENCE SYMBOLS

1 Light distribution
2 Malfunctioning pixel
3 Pixel adjacent to the malfunctioning pixel in a horizontal orientation
4 Pixel adjacent to the malfunctioning pixel in a vertical direction
5 Pixel at a greater distance from the malfunctioning pixel in a horizontal orientation
6 Pixel at a greater distance from the malfunctioning pixel in a vertical orientation
7 Gradient of brightness

The invention claimed is:
1. A method for operating an illuminating device for a vehicle that features means of influencing light or a plurality of light sources for a targeted generation of pixels of a light distribution, the method comprising the steps of:
 detecting failure of at least one pixel of the light distribution caused by at least one of:
  a defect in one section of the means of influencing light or
  by malfunction of one of the plurality of light sources;
 actuating at least one non-defective section of the means of influencing light or at least one non-malfunctioning light source to correct the light distribution such that at least one pixel of the light distribution adjacent to the at least one malfunctioning pixel is reduced in its brightness; and wherein a plurality of non-defective sections of the means of influencing light or several of the non-malfunctioning light sources are actuated such that a plurality of pixels of the light distribution that are at different distances from the at least one malfunctioning pixel are reduced to different extents in their brightness, where at least one first pixel adjacent to the at least one malfunctioning pixel of the light distribution is reduced to a greater extent in its brightness than at least one second pixel further away from the at least one malfunctioning pixel of the light distribution.

2. The method in accordance with claim 1, wherein the at least one non-defective section of the means of influencing light or the at least one of the non-malfunctioning light sources is actuated in such a way that a plurality of pixels of the light distribution adjacent to the at least one malfunctioning pixel are reduced in their brightness.

3. The method in accordance with claim 1, wherein at least one pixel adjacent to at least one malfunctioning pixel of the light distribution is reduced in its brightness such that the transition from the at least one malfunctioning pixel to the at least one adjacent pixel does not feature a hard gradient.

4. The method in accordance with claim 1, wherein at least one pixel adjacent to the at least one malfunctioning pixel of the light distribution or pixels located in its vicinity are reduced in their brightness by 20% to 40%.

5. The method in accordance with claim 1, wherein a new light distribution is calculated that takes into account a defect in one section of the means of influencing light or the malfunction of one of the light sources, where the means of influencing light or the light sources are actuated in accordance with the newly calculated light distribution.

6. An illuminating device for a vehicle, comprising
 means of influencing light or a plurality of light sources for targeted generation of pixels of a light distribution, and
 a control system for actuating the means of influencing light or the light sources,
 wherein the control systems:
 detect failure of at least one pixel of the light distribution caused by at least one of:
  a defect in one section of the means of influencing light or
  by malfunction of one of the plurality of light sources; and
 actuate at least one non-defective section of the means of influencing light or at least one non-malfunctioning light source to correct the light distribution such that at least one pixel of the light distribution adjacent to the at least one malfunctioning pixel is reduced in its brightness; and
 wherein the illuminating device comprises, in addition to the means of influencing light, at least one light source whose light hits the means of influencing light during operation of the illuminating device and is reflected or switched off or deflected by the means of influencing light in a targeted manner with regard to individual pixels or groups of pixels, where the light influenced in such a way by the means of influencing light at least partially exits the illuminating device.

7. The illuminating device in accordance with claim 6, wherein the means of influencing light is designed as a digital micromirror device or as an LCoS or LC display or that the means of influencing light comprises a digital micromirror device or an LCoS or an LC display.

8. The illuminating device in accordance with claim 6, wherein the light sources are designed as light emitting diodes or as laser diodes, where the light emitting diodes or laser diodes are arranged in a matrix.

9. The illuminating device in accordance with claim 6, wherein the illuminating device is a headlamp.

* * * * *